(12) United States Patent
Buechner et al.

(10) Patent No.: US 8,407,654 B2
(45) Date of Patent: Mar. 26, 2013

(54) GLITCH POWER REDUCTION

(75) Inventors: Thomas Buechner, Weil im Schoenbuch (DE); Markus Buehler, Weil im Schoenbuch (DE); Markus Olbrich, Langenhagen (DE); Philipp Panitz, Schoenaich (DE); Lei Wang, Hannover (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/365,972

(22) Filed: Feb. 3, 2012

(65) Prior Publication Data

US 2012/0266120 A1 Oct. 18, 2012

(30) Foreign Application Priority Data

Feb. 23, 2011 (EP) .................................. 11155643

(51) Int. Cl.
*G06F 17/50* (2006.01)
(52) U.S. Cl. ....................................................... 716/133
(58) Field of Classification Search .................... 716/133
See application file for complete search history.

(56) References Cited

U.S. PATENT DOCUMENTS

| | | | |
|---|---|---|---|
| 2012/0016652 A1* | 1/2012 | Stamoulis et al. | 703/14 |
| 2012/0092046 A1* | 4/2012 | Li et al. | 327/143 |
| 2012/0216160 A1* | 8/2012 | Buechner et al. | 716/109 |
| 2012/0216168 A1* | 8/2012 | Buechner et al. | 716/133 |

FOREIGN PATENT DOCUMENTS

WO 2010004668 1/2010

OTHER PUBLICATIONS

"Dynamic Power Reduction in Flash FPGAs", Actel Mar. 2009, 23 pages.
Agrawal, Vishwani D. et al., "Digital circuit design for minimum transient energy and a linear programming method", VLSI Design, 1999. Proceedings. Twelfth International Conference on Jan. 7-10, 1999, pp. 434-439.
Alexander, Jins D. et al., "Algorithms for Estimating Number of Glitches and Dynamic Power in CMOS Circuits with Delay Variations", 2009 IEEE Computer Society Annual Symposium on VLSI May 13-15, 2009, 6 pages.
Alexander, Jins D. et al., "Computing Bounds on Dynamic Power Using Fast Zero-Delay Logic Simulation", System Theory, 2009. SSST 2009. 41st Southeastern Symposium Mar. 15-17, 2009, pp. 107-112.

(Continued)

*Primary Examiner* — Suchin Parihar
(74) *Attorney, Agent, or Firm* — DeLizio Gilliam, PLLC (57) ABSTRACT

A method comprises reducing power consumption of an electronic circuit, wherein the electronic circuit comprises at least one logic cone with at least one gate having a single output net, wherein representations of the at least one gate are instances of elements from a standard cell library. Reducing of the power consumption comprises determining an upper bound for dynamic power consumption by calculating transition metrics and power metrics for each gate. Reducing of the power consumption comprises selecting gates with an upper bound for power consumption greater than a predetermined threshold value. For each selected gate, performing operations comprising: testing multiple configurations from the standard cell library for the selected gate by calculating respective upper bound for power consumption for each of the multiple configurations; selecting gate configuration with minimum upper bound for power consumption; and modifying the gate-level design representation according to the selected gate configuration.

20 Claims, 5 Drawing Sheets

OTHER PUBLICATIONS

Berkelaar, Michel R. et al., "Gate sizing in MOS digital circuits with linear programming", Design Automation Conference, 1990. EDAC. Proceedings of the European http://ieeexplore.ieee.org/stamp/stamp.jsp?arnumber=136648 (Obtained from the Internet on Dec. 21, 2011) Mar. 12-15, 1990, pp. 217-221.

Ding, Chih-Shun et al., "Gate-level power estimation using tagged probabilistic simulation", Computer-Aided Design of Integrated Circuits and Systems, IEEE Transactions on http://ieeexplore.ieee.org/stamp/stamp.jsp?tp=&arnumber=736184 (Obtained from the Internet on Dec. 21, 2011) Nov. 2009, pp. 1099-1107.

English, T. et al., "HotSpot : Visualizing Dynamic Power Consumption in RTL Designs", Sep. 20, 2010, pp. 45-48.

Hu, Fei et al., "Input-specific Dynamic Power Optimization for VLSI Circuits", Low Power Electronics and Design, 2006. ISLPED'06. Proceedings of the 2006 International Symposium on http://ieeexplore.ieee.org/stamp/stamp.jsp?arnumber=4271842 (Obtained from the Internet on Dec. 21, 2011) Oct. 4-6, 2006, pp. 232-237.

Najm, F. N. et al., "An extension of probabilistic simulation for reliability analysis of CMOS VLSI circuits", vol. 10, Issue 11, Computer-Aided Design of Integrated Circuits and Systems, IEEE Transactions on http://ieeexplore.ieee.org/ stamp/stamp.jsp?arnumber=97616 (Obtained from the Internet on Dec. 21, 2011) Nov. 1991, pp. 1372-1381.

Najm, F. N., "Low-pass filter for computing the transition density in digital circuits", vol. 13, Issue 9, Computer-Aided Design of Integrated Circuits and Systems, IEEE Transactions on http://ieeexplore.ieee.org/stamp/stamp.jsp?arnumber=310901 (Obtained from the Internet on Dec. 21, 2011) Sep. 1994, pp. 1123-1131.

Najm, F. N., "Transition density: a new measure of activity in digital circuits", vol. 12, Issue 2 Computer-Aided Design of Integrated Circuits and Systems, IEEE Transactions on http://ieeexplore.ieee.org/stamp/stamp.jsp?tp=&arnumber=205010 (Obtained from the Internet on Dec. 21, 2011) Feb. 1993, pp. 310-323.

Raja, Tezaswi et al., "Minimum dynamic power CMOS circuit design by a reduced constraint set linear program", VLSI Design, 2003. Proceedings. 16th International Conference on http://ieeexplore.ieee.org/stamp/stamp.jsp?arnumber=1183188 (Obtained from the Internet on Dec. 21, 2011) Jan. 4-8, 2003, pp. 527-532.

Raja, Tezaswi et al., "Variable input delay CMOS logic for low power design", VLSI Design, 2005. 18th International Conference on http://ieeexplore.ieee.org/stamp/stamp.jsp?arnumber=1383340 (Obtained from the Internet on Dec. 21, 2011) Jan. 3-7, 2005, pp. 598-605.

Wang, L. et al., "Fast dynamic power estimation considering glitch filtering", SOC Conference, 2009. SOCC 2009. IEEE International Sep. 9-11, 2009, pp. 361-364.

Wang, L. et al., "On Glitch Power Reduction", SOC Conference (SOCC), 2011 IEEE International Nov. 21, 2011, pp. 24-29.

"U.S. Appl. No. 13/365,989 Office Action", Feb. 13, 2013, 13 pages.

* cited by examiner

GLITCH POWER REDUCTION

CROSS-REFERENCE TO RELATED APPLICATION

This application claims priority under 35 U.S.C. 119 from European Patent Application No. EP11155643 filed Feb. 23, 2011, the entire contents of which are incorporated herein by reference.

BACKGROUND

Embodiments relate in general to the field of developing integrated electrical circuits, and in particular to a method for reducing power consumption of an electronic circuit, and a system for reducing power consumption of an electronic circuit. Still more particularly, embodiments relate to a data processing program and a computer program product for reducing power consumption of an electronic circuit.

In CMOS technology, glitch power dissipated in combinational circuits owns an important portion of the total dynamic power consumption. Conventional methods for power estimation include called Monte Carlo Simulation (MCS). For this technique, a digital simulator and information about gate and interconnect delays are necessary. The runtime of MCS is high.

Statistical Methods (SM), e.g. IMS-PE, CREST, TPS, are also extensively investigated techniques. SMs are like one-period simulation using a special gate model which requires signal probabilities instead of multi-valued logic. It's faster than Monte Carlo simulation. The nature of SM is like a one-period digital simulation. Therefore, its runtime is still not low enough. In the lack of consideration of correlations the accuracy is also limited. Test cases have shown that especially the estimated power on the nets near the POs may show up to 400% error.

In VLSI design, great attention is paid to the power consumption of circuits. Research covers power estimation and power optimization from system to electrical level. The challenge of lower-level power estimation is to find a reasonable trade-off between computational effort and accuracy of power estimation. For instance, the tools based on SMs can estimate the dynamic power of combinational circuits very efficiently. However, they all suffer more or less from a poor accuracy. Especially, if the dynamic power per net is considered, a satisfying accuracy cannot be reached.

In CMOS circuits, power is dissipated due to the static leakage current and the dynamic current caused by signal transition. During the signal transition a dynamic current flows through the transistor and charges or discharges the parasitic capacitances. The appropriate power is called dynamic power. It can be modeled according to equation (1):

$$P_{dynamic} = \sum_n \frac{1}{2} V_{dd}^2 C_n f_c \alpha_n \quad (1)$$

Wherein $V_{dd}$, $f_c$, $C_n$, and $\alpha_n$ are supply voltage, clock frequency, net capacitance and signal transition rate, respectively. It is obvious that besides scaling down supply voltage and clock frequency, one can also reduce the product of transition rate and net capacitance or either of them to reduce dynamic power.

In combinational circuits, signals are expected to change at most once in one clock period. However, there are almost always unnecessary signal transitions, which are called glitches. If the timing conditions such as setup-time and hold-time of the registers are satisfied, the circuit can still work. However, the signal transition rate an is increased due to the glitches, and therefore more power is consumed by the unnecessary signal transitions. If glitches can be eliminated, dynamic power is reduced. Glitches are caused by different arrival times of signals at the inputs of the gate.

Algorithms were proposed to optimize dynamic power consumption. For full-custom design, power optimization algorithms can result in a glitch-free design. A conventional technique is called path balancing. Besides, hazard filtering is another technique proposed which can be considered as an extension of path balancing. It shows that it is not necessary to balance the signal path exactly to eliminate the glitches. This technique indicates that the gate inertia can stop not only the generation but also the propagation of glitches. According to hazard filtering, a glitch free design needs to satisfy the requirement that the differences of signal arrival times at the inputs of all gates in the circuit must be less than their inertial delays.

Conventional techniques apply a zero-delay model in the simulation to reduce the number of events per period since if normal delay model (non-zero delay model) is applied in the simulation, lots of events could probably be generated in every clock period to model the circuit behavior. In applying the zero-delay model the whole simulation must be shorter, obviously, because the number of events per period is no more than the number of the gates in the circuit. However, the accuracy would be destroyed, if no further method would be employed to take care of the glitches.

SUMMARY

Some example embodiments include a method for reducing power consumption of an electronic circuit using a gate-level design representation, wherein the electronic circuit comprises at least one logic cone with at least one gate having a single output net, wherein representations of the at least one gate are instances of elements from a standard cell library. The reducing of the power consumption of the electronic circuit comprises determining an upper bound for dynamic power consumption by calculating transition metrics and power metrics for each gate in the electronic circuit. The reducing of the power consumption of the electronic circuit comprises selecting gates with an upper bound for power consumption greater than a predetermined threshold value. For each selected gate performing the following operations. A first operation includes testing multiple configurations from the standard cell library for the selected gate by calculating respective upper bound for power consumption for each of the multiple configurations. A second operation includes selecting gate configuration of the multiple configurations with minimum upper bound for power consumption. A third operation includes modifying the gate-level design representation according to the selected gate configuration.

BRIEF DESCRIPTION OF THE DRAWINGS

Inventive features regarded as the characteristics of the present inventive subject matter are set forth in the Summary of the Inventive subject matter and the appended claims. However, the present inventive subject matter, its implementation mode, other objectives, features and advantages will be better understood through reading the following detailed description of the exemplary embodiments with reference to the accompanying drawings, wherein:

DESCRIPTION OF EMBODIMENTS

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
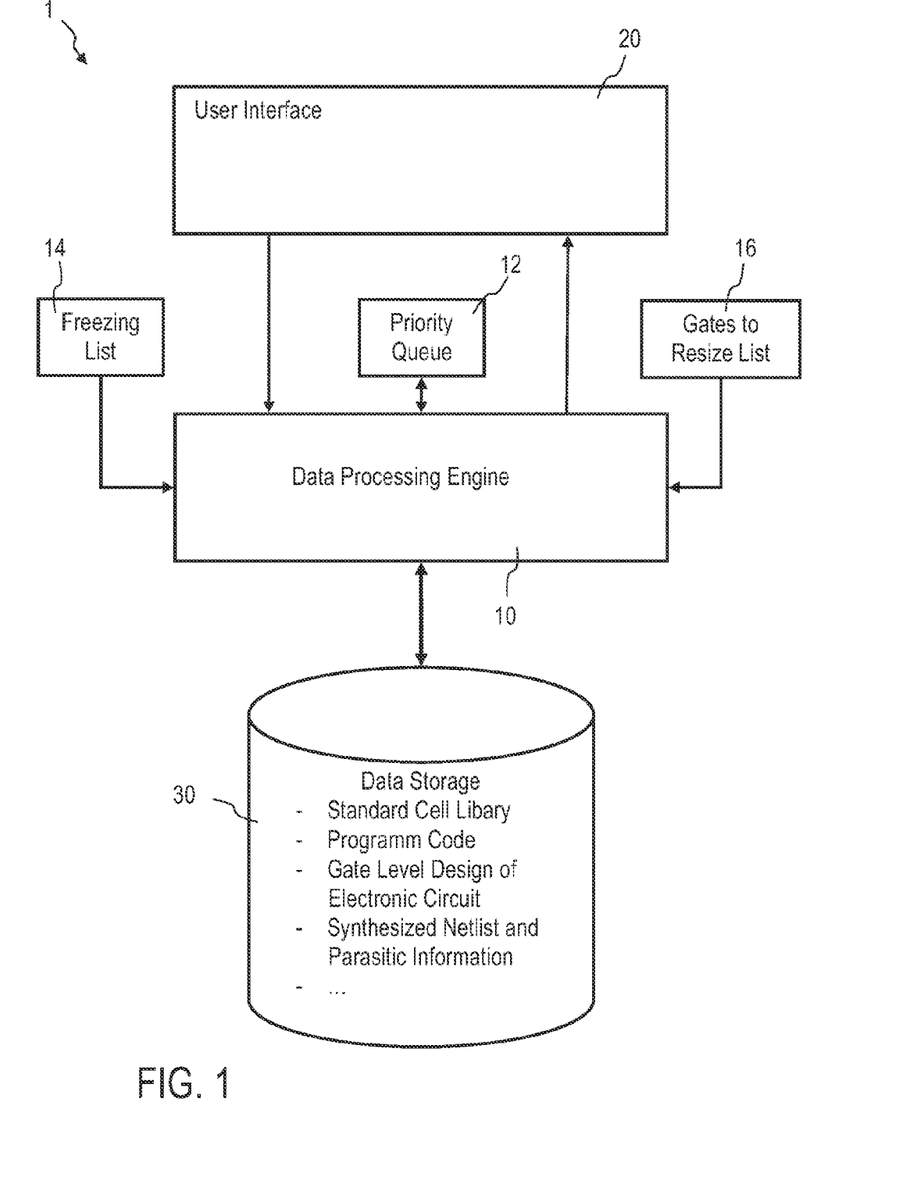
FIG. 1 depicts a schematic block diagram of a system for reducing power consumption of an electronic circuit, according to some example embodiments.
Figure 9:
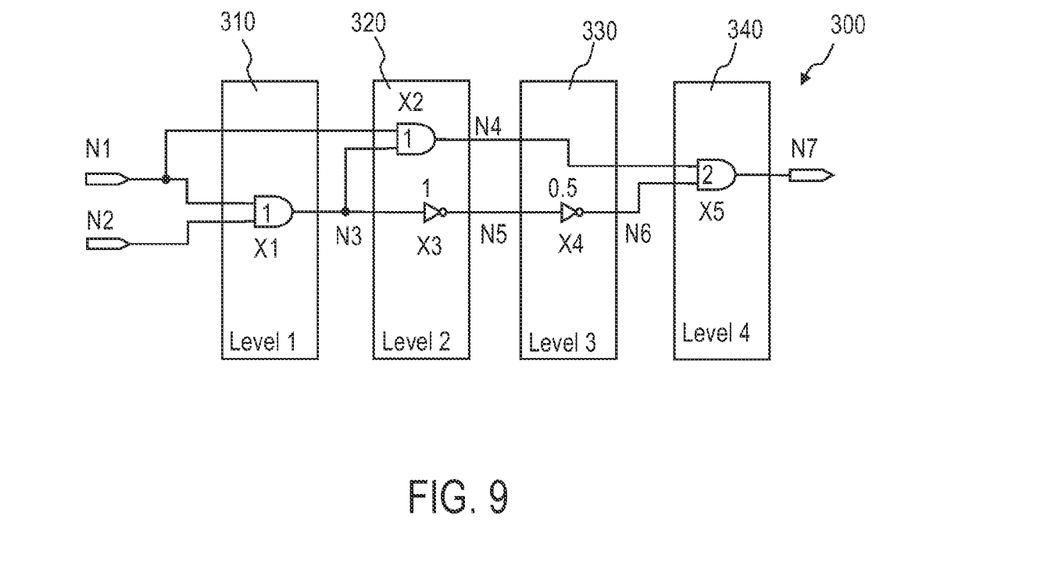
FIG. 9 depicts a circuit diagram of a second embodiment of an electrical circuit to evaluate showing different levels of the electrical circuit, according to some example embodiments.
Figure 10:
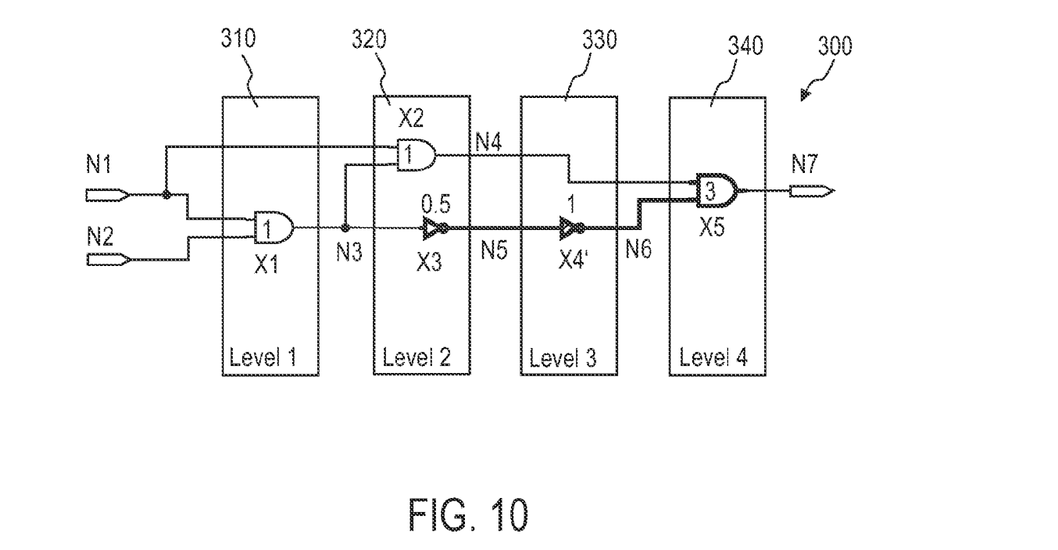
FIG. 10 depicts a circuit diagram of the second embodiment of an electrical circuit to evaluate shown in FIG. 9 with a resized gate, according to some example embodiments.

FIG. 1 depicts a schematic block diagram of a system for reducing power consumption of an electronic circuit, according to some example embodiments. FIG. 9 shows an embodiment of an electrical circuit to evaluate comprising exemplary a logic cone 300 and five logic gates X1, X2, X3, X4, X5 showing different levels 310, 320, 330, 340 of the electrical circuit, and FIG. 10 shows the embodiment of the electrical circuit to evaluate of FIG. 9 with a logic cone 300' comprising logic gates X1, X2, X3, X5 and a resized logic gate X4' instead of original logic gate X4 as result of the optimization process.

Referring to FIG. 1, the shown embodiment employs a system 1 for reducing power consumption of an electronic circuit using a gate-level design description. Embodiments of such an electronic circuit to evaluate are shown in FIG. 9 or 10 and comprise at least one cone 300, 300' with at least one gate X1, X2, X3, X4, X4', X5 having a single output net N3, N4, N5, N6, N7 only, wherein representations of the at least one gate X1, X2, X3, X4, X4', X5 are instances of elements from a standard cell library.

The shown system 1 for reducing power consumption of an electronic circuit is represented by a computing environment and comprises a user interface 20 for managing I/O functions of the system 1, a data storage 30 for storing computer usable program code, the standard cell library, the gate-level design of the electronic circuit, synthesized net list, parasitic information and data, etc., and a data processing engine 10 in electronic communication with the user interface 20 and the data storage 30. According to some example embodiments, the data processing engine 10 determines an upper bound for dynamic power consumption by calculating transition metrics and power metrics for each gate X1, X2, X3, X4, X4' X5 in the electronic circuit; and selects gates X4 with an upper bound for power consumption greater than a predetermined threshold value. For each selected gate X4 the data processing engine 10 performs following steps: Testing all configurations from the standard cell library for the gate X4 under consideration by calculating respective upper bound for power consumption for each gate configuration; selecting gate configuration with minimum upper bound for power consumption; and modifying the gate-level design representation according to the selected gate configuration.

During the optimization process the data processing engine 10 writes the selected gates, here the gate X4 to a gates to resize list 16.

Figure 2:
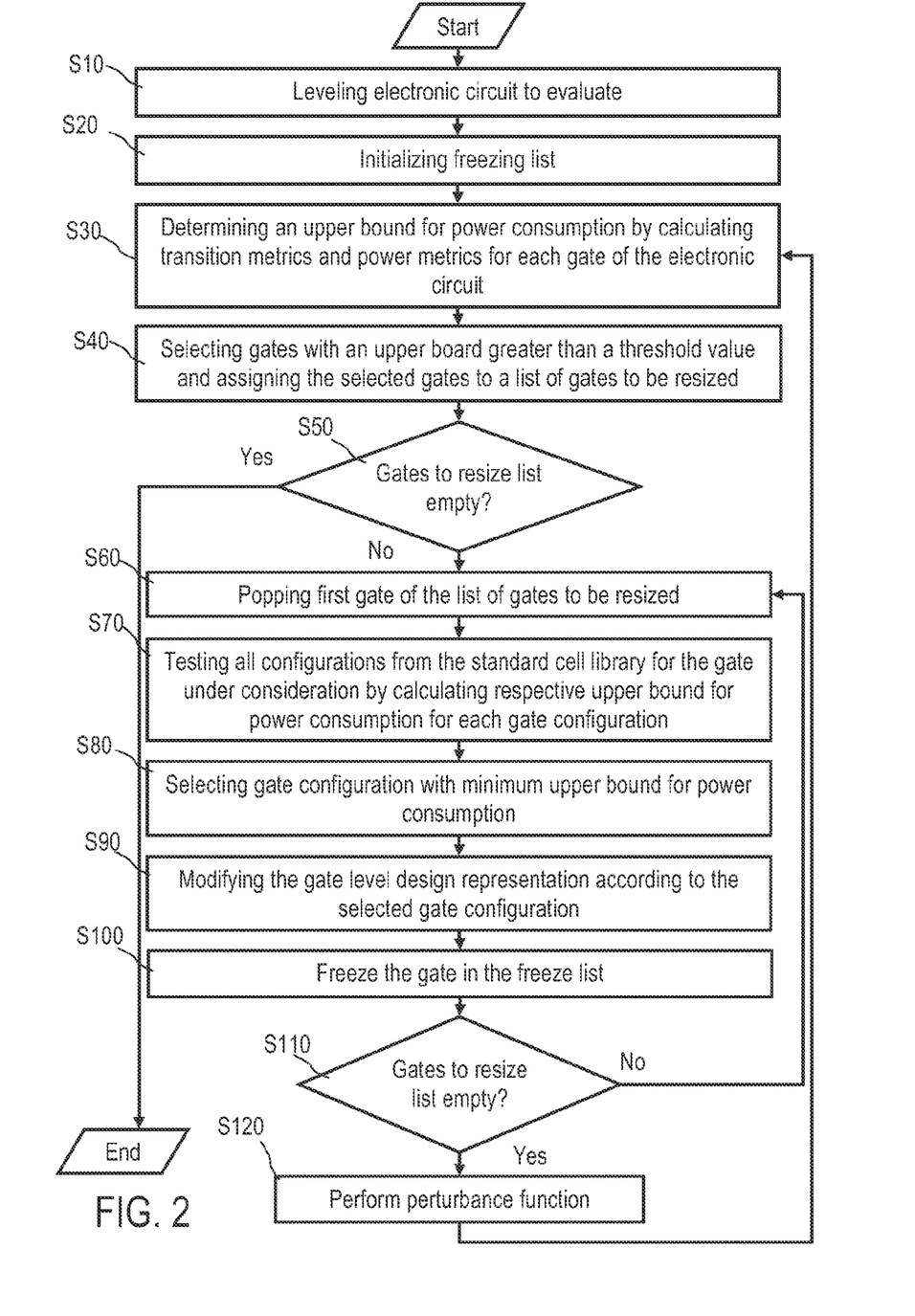
FIG. 2 depicts a schematic flow chart of a method for reducing power consumption of an electronic circuit, according to some example embodiments.

FIG. 2 depicts a schematic flow chart of a method for reducing power consumption of an electronic circuit, according to some example embodiments.

Referring to FIG. 2 the shown embodiment employs a method for reducing power consumption of an electronic circuit using a gate-level design description, wherein embodiments of such an electronic circuit to evaluate are shown exemplary in FIG. 9 or 10 and comprise at least one cone 300, 300' with at least one gate X1, X2, X3, X4, X4', X5 having a single output net N3, N4, N5, N6, N7 only, wherein representations of said at least one gate X1, X2, X3, X4, X4', X5 are instances of elements from a standard cell library.

According to some example embodiments, in step S10 the electronic circuit to evaluate is levelized by sorting the gates X1, X2, X3, X4, X4', X5 in the electronic circuit in different levels 310, 320, 330, 340 according to their logic depth; and in step S20 a freezing list 14 is initialized. In step S30 an upper bound for dynamic power consumption is determined by calculating transition metrics and power metrics for each gate X1, X2, X3, X4, X4' X5 in the electronic circuit. In step S40 gates, here gate X4, with an upper bound for power consumption greater than a predetermined threshold value are selected and assigned to the gates to resize list 16. Query S50 checks if the gates to resize list 16 is empty. If the gates to resize list 16 is empty the method is finished. If the gates to resize list 16 is not empty the first gate X4 of the gates to resize list 16 is popped in step S60. In step S70 all configurations from the standard cell library for the gate X4 under consideration is tested by calculating respective upper bound for power consumption for each gate configuration. In step S80 gate configuration with minimum upper bound for power consumption is selected; and the gate-level design representation is modified according to the selected gate configuration in step S90. In step S100 the gate X4 under consideration is added to the freezing list 14 after testing. Query S110 checks if the gates to resize list 16 is empty. If the gates to resize list 16 is not empty the optimizing process returns to step S60. If the gates to resize list 16 is empty a perturbance function is performed in step S120. The perturbance function is implemented to prevent the solution from a local optimum and to release randomly some gates frozen in the freezing list 14 after all selected gates are resized. The gates newly pushed into the freezing list 12 are much more likely to be released than the gates that stay in the freezing list for a long time. With the increase of optimization steps, the number of gates that are allowed to be released from the freezing list decreases as well. After such a stochastic decision the method returns to step S30 and a new gates to resize list 16 is determined. The optimization procedure runs until the gates to resize list 16 is empty. If no gates are written to the new gates to resize list 16, because the upper bound for power consumption of all gates X1, X2, X3, X4', X5 of the electronic circuit is smaller than the predetermined threshold value, an empty gates to resize list 16 is generated and the optimization procedure is finished.

Figure 3:
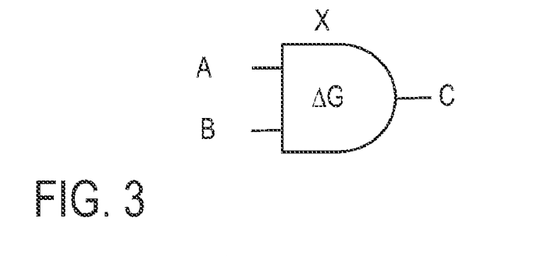
FIG. 3 depicts an equivalent circuit diagram of a logic gate to explain the occurrence of glitches, according to some example embodiments.
Figure 4:
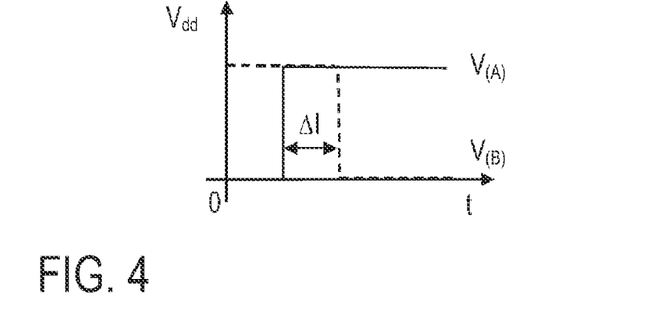
FIGS. 4-6 depict characteristic voltage diagrams at input and output nets of the logic gate of FIG. 3 to explain the occurrence of glitches, according to some example embodiments.
Figure 5:
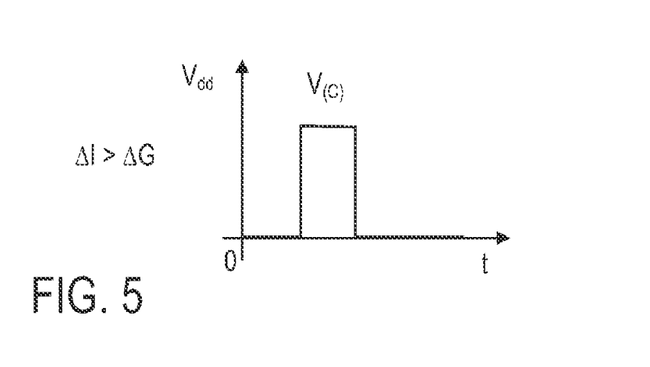
Figure 6:
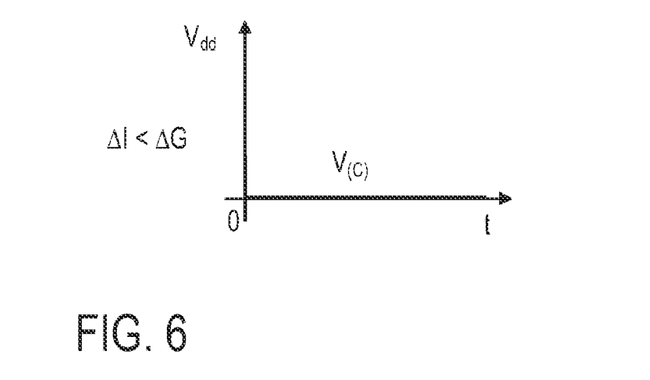

FIG. 3 shows a logic AND-gate X; and FIGS. 4-6 show waveforms at input nets A, B and output net C of the logic AND-gate X to explain the occurrence of glitches.

Referring to FIG. 3, the exemplary logic AND-gate X comprises two input nets A, B and only one output net C and has an inertial delay ΔG. Referring to FIG. 4, $V_{(A)}$ denotes a voltage waveform at input net A, and $V_{(B)}$ denotes a voltage waveform at input net B, wherein $V_{dd}$ denotes a supply voltage of the logic AND-gate X. ΔI denotes an interval between signal transitions at input net A and input net B. Unnecessary signal transition so called glitches occur when difference of input signal delay ΔI is bigger than the inertial delay ΔG of the corresponding logic gate X. FIG. 5 shows the case where the input signal delay ΔI is bigger than the inertial delay ΔG of the corresponding logic gate X and a glitch $V_{(C)}$ occurs at the output net C. FIG. 6 shows the case where the input signal delay ΔI is smaller than the inertial delay ΔG of the corresponding logic gate X and no glitch $V_{(C)}$ occurs at the output net C. Occurring Glitches $V_{(C)}$ may propagate through subsequent logic and the problem is aggravating especially for deep logic cones.

Figure 7:
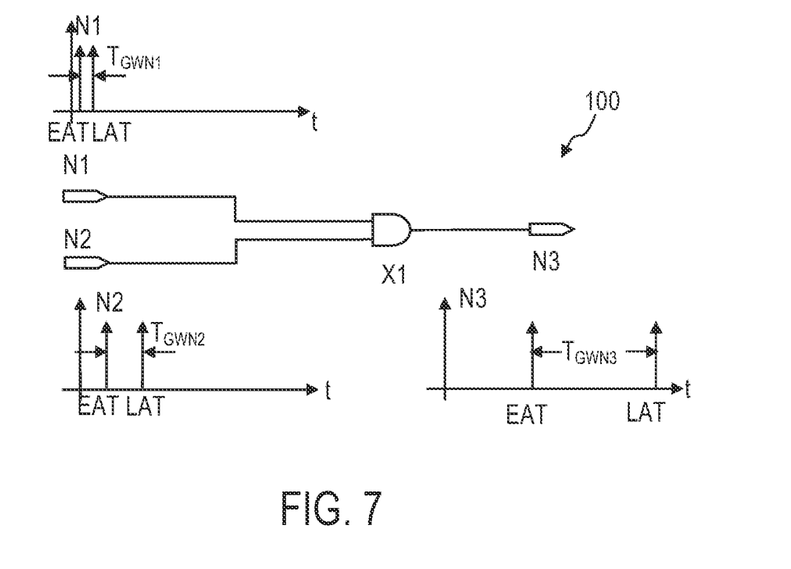
FIG. 7 depicts a circuit diagram of a first embodiment of an electrical circuit to evaluate with corresponding waveform diagrams to explain the definition of a glitch window, according to some example embodiments.
Figure 8:
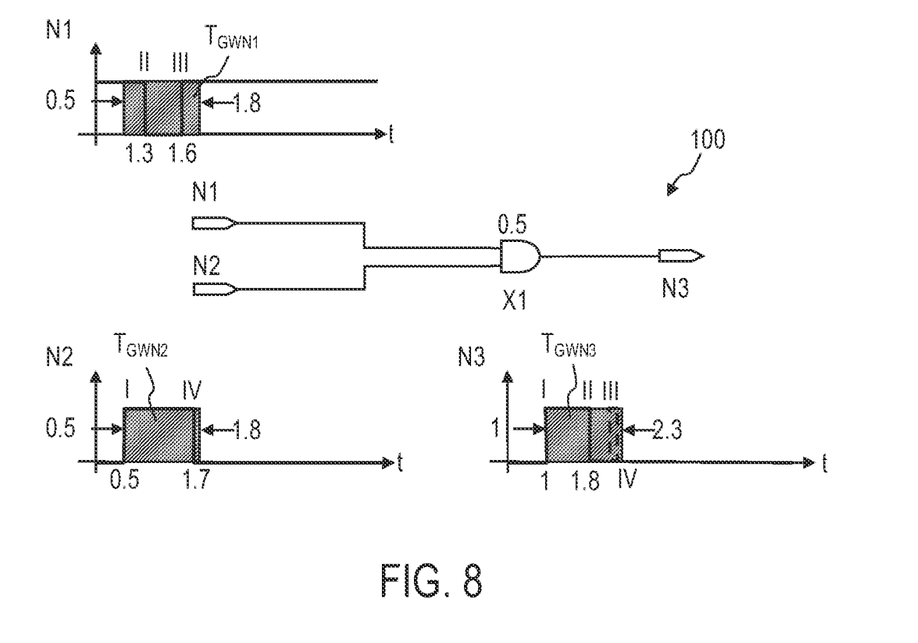
FIG. 8 depicts a circuit diagram of a first embodiment of an electrical circuit to evaluate with corresponding waveform diagrams to explain the definition of a transition metric, according to some example embodiments.

FIGS. 7 and 8 show a first embodiment of an electrical circuit to evaluate comprising a logic cone 100 with two primary input nets N1, N2, one output net N3 and a logic gate X1 implemented as AND-gate having an inertial delay ΔG of 0.5. A first primary input net N1 is also a first input net of the logic gate X1 and a second primary input net N2 is also a second input net of the logic gate X1. The only output net of the logic gate X1 is also the output net N3 of the logic cone 100 because the logic gate X1 is also the end of the logic cone 100.

Referring to FIG. 7, as stated before glitches are caused by the difference of the signal arrival times EAT, LAT at the inputs of a gate X1. A glitch window $T_{GWN1}$, $T_{GWN2}$, $T_{GWN3}$ is defined as a region in which glitches can appear. So the glitch window $T_{GWN1}$, $T_{GWN2}$, $T_{GWN3}$ is the time interval bounded by the earliest and the latest signal arrival time EAT, LAT at a net N1, N2, N3. A first waveform diagram shows a first glitch window $T_{GWN1}$ at the first primary input net N1, a second waveform diagram shows a second glitch window $T_{GWN2}$ at the second primary input net N2, and a third waveform diagram shows a third glitch window $T_{GWN3}$ at the output net N3.

The margins of the glitch windows $T_{GWN1}$, $T_{GWN2}$, $T_{GWN3}$ can be determined by using static timing analysis. However, the glitch windows $T_{GWN1}$, $T_{GWN2}$, $T_{GWN2}$, $T_{GWN3}$ determined by using delays from static timing analysis can be very pessimistic because the calculation of early-mode and late-mode of static timing analysis picks only the minimal and maximal delays and corresponding transition times which do not represent most practical cases. In the following a method to calculate the delays in the combinational circuits is proposed which is similar to the static timing analysis.

In static timing analysis the gate delay is modeled by a Look-Up-Table (LUT) and the delay calculator uses this LUT and calculates all path-delays summing up the delays and arrival times from inputs to outputs. The minimal and maximal arrival times are selected respectively and the corresponding delays and transition times are recorded and passed to the fan-out gate simultaneously. In this way, the glitch-window is always of maximal width and cannot represent most practical cases. Instead of selecting the minimum and maximum from all path-delays, the delays on the same path are averaged. Then, from the averaged path-delays the minimal and maximal delays and the corresponding averaged transition times are determined and passed to the fan-out gates.

Referring to FIG. 8, a first waveform diagram shows a first glitch window $T_{GWN1}$ at the first primary input net N1. A second waveform diagram shows a second glitch window $T_{GWN2}$ at the second primary input net N2, and a third waveform diagram shows a third glitch window $T_{GWN3}$ at the output net N3. The first glitch window $T_{GWN1}$ starts at 0.5 and ends at 1.8, the second glitch window $T_{GWN2}$ also starts at 0.5 and ends at 1.8, and the third glitch window $T_{GWN3}$ starts at 1 and ends at 2.3, due to the inertial delay ΔG of 0.5 of the logic gate X1. The accurate number of signal transitions I, II, III, IV depends on the input patterns, the slews of the input signals and the characterization of the logic gates, here the logic gate X1, in the logic cone 100. To estimate the accurate number of signal transitions is too expensive to afford by the optimization procedure. Therefore, the calculation is limited to calculation of the transition metric inside of the corresponding glitch window $T_{GWN1}$, $T_{GWN2}$, $T_{GWN3}$.

The glitch window $T_{GWN1}$, $T_{GWN2}$, $T_{GWN3}$ describes the difference of arrival times of the input signals at the corresponding gate X1, wherein a number Nk of signal transitions at the output N3 of the gate X1 cannot exceed an upper bound calculated according to equation (2):

$$N_k = \min\left\{\sum_{i \in \{gateinputs\}} N_i, 1 + \left\lfloor \frac{T_{GW}}{d} \right\rfloor\right\} \quad (2)$$

Wherein Ni is the number of signal transitions which might occur at input i, $T_{GW}$ is the glitch-window and d is the inertial delay of the gate X1. This upper bound consists of two terms. The first term indicates that the number of signal transitions at the output N3 cannot exceed the sum of signal transitions occurring at all inputs N1, N2. It is determined by summing the previously calculated bounds at the outputs of fan-in gates. The second term takes the inertial delay of the gate X1 in consideration. The minimum of the second margin is one because the nodes in the combinational circuit are supposed to change at least once in one clock period. In the shown embodiment of the logic cone 100 the upper bound of the number of signal transitions is 3 calculated according to equation (2), wherein at the first input net N1 a first signal transitions occurs at 1.3 and a second signal transition occurs at 1.6, and at the second input net N2 a first signal transitions occurs at 0.5 and a second signal transition occurs at 1.7. So at each input net N1, N2 two signal transitions occur. The third glitch window starts at 1 and ends at 2.3 and the inertial delay of gate X2 is 0.5.

$$N_{N3} = \min\left\{2 + 2, 1 + \left\lfloor \frac{(2.3 - 1)}{0.5} \right\rfloor\right\} = 3$$

However, inertial delays of the gates are typically not defined in a standard cell library. Instead, an averaged path-delay is used to approximate the inertial delay. In equation (2) the calculated bound is an integer, because the first term is naturally an integer and the fractional part of the second term is truncated. If such a bound is used directly in the optimization, it could occur that the glitch window shrinks, but the value of this bound stays the same. No difference can be told among different gate sizes. Therefore, the truncation operator is omitted and a new quantity is defined. Due to the uncertainty introduced by the averaged path-delays, a transition metric (TM) at the output of a gate is defined according to equation (3):

$$TM_{out} = \min\left\{\sum_{i\in\{gateinputs\}} TM, 1 + \frac{T_{GW_{out}}}{d_{ave}}\right\} \quad (3)$$

Wherein TM, is the transition metric at input i, $T_{GWout}$ is the glitch window and $d_{ave}$ is the averaged path-delay of the corresponding gate. This transition metric represents a modified upper bound of the number of signal transitions at a net.

According to equation (1), dynamic power consumption depends on supply voltage, clock frequency, net capacitance and transition rate. The supply voltage and clock frequency are regarded as constants in this application. Embodiments of the present invention propose a power metric to denote the dynamic power. The power metric (PM) at net n is defined by equation (4):

$$PM_n = TM_n \cdot C \quad (4)$$

Wherein TMn and Cn are the transition metric and net capacitance at net n, respectively.

Combinational circuit can be described as a directed acyclic graph (DAG) G(V,E) where V is the set of nodes describing gates, primary inputs (PIs) and primary outputs (POs) and E describes the set of interconnects between gates, primary inputs (PIs) and primary outputs (POs). Since the total dynamic power of an electrical circuit should be reduced instead of only glitch power, the objective function is defined as the sum of dynamic power in the circuit or dynamic power metric according to formula (5):

$$\sum_{i=1}^{n} P(N_i) \to \min \quad (5)$$

Wherein P(Ni) is the dynamic power or a dynamic power metric of net Ni and n is the total number of nets in the electrical circuit. This objective function can be extended according to formula (6) if leakage power needs to be taken into account by an additional term:

$$\sum_{i=1}^{n} P(N_i) + \sum_{i=1}^{k} P(V_i) \to \min \quad (6)$$

Wherein k is the total number of gates in the circuit.

In a semi-custom electric circuit design, logic gates in a standard cell library are used instead of scaling gates freely. In standard cell libraries the gate size is mapped to a discrete quantity called drive strength. This feature is formulated as a constraint according to formula (7):

$$size(V_i | V_i \notin \{PIs,POs\}) \in \{\_A, \_B, \_C, \ldots\} \quad (7)$$

Wherein _A, _B, _C are different drive strengths of the gate Vi. Additionally or alternatively instead of mapping the drive strength as discrete quantity to the gate size, a threshold voltage can also be mapped to the gate size as discrete quantity.

Besides the constraint on the gate size, timing requirements must also be satisfied, i.e. the slacks at primary outputs have to be checked according to formula (8):

$$slack(V_i | V_i \in \{POs\}) > slack_{required} \quad (8)$$

Wherein the left hand side of the inequality is the calculated slack and the right hand side is the required slack which must be at least greater than zero.

The optimization problem by using gate sizing is a discrete gate sizing problem. Embodiments of the present invention propose a novel heuristic algorithm based on gate sizing using the power metric defined above. Dynamic power of a net N1, N2, N3 is dependent on the product of the net capacitance and the transition rate. Embodiments of the present invention select gates with high transition metrics at output nets in the electrical circuit investigate all possible sizes of this gate available in the standard cell library and pick the configuration with the lowest total power metric.

An investigation function returns all proper sizes in the standard cell library according to the logic function of the corresponding gate. The returned cell configurations are satisfying the constraints that the maximal load capacitance it can drive must be greater than the required load capacitance. Embodiments of the present invention search for a gate configuration satisfying the timing requirements and dissipating the minimum dynamic power.

FIG. 9 shows a second embodiment of an exemplary electrical circuit to evaluate; and FIG. 10 shows the second embodiment of an electrical circuit to evaluate of FIG. 9 with a resized gate X4'.

Referring to FIG. 9, the electrical circuit to evaluate comprises a logic cone 300 with two primary input nets N1, N2, one output net N7 a first logic gate X1 implemented as AND-gate having an inertial delay of 1, a second logic gate X2 implemented as AND-gate having an inertial delay of 1, a third logic gate X3 implemented as inverter having an inertial delay of 1, a fourth logic gate X4 implemented as inverter having an inertial delay of 0.5, and a fifth logic gate X5 implemented as AND-gate having an inertial delay of 2. A first primary input net N1 is also a first input net of the first logic gate X1 and a first input net of the second logic gate X2. A second primary input net N2 is also a second input net of the first logic gate X1, and the only output net of the first logic gate X1 is denoted as N3 and is also a second input net of the second logic gate X2 and an input net of the third logic gate X3. An only output net of the second logic gate X2 is denoted with N4 and is also a first input net of the fifth logic gate X5. An only output net of the third logic gate X3 is denoted with N5 and is also an input net of the fourth logic gate X4. An only output net of the fourth logic gate X4 is denoted with N6 and is also a second input net of the fifth logic gate X5. The output net N7 of the logic cone 300 is also the output net of the fifth logic gate X5, because the fifth logic gate X5 is also the end of the logic cone 300.

Referring to FIGS. 1, 2, and 9 the full circuit calculation is explained. As shown in FIG. 9, the logic cone 300 of the electrical circuit is levelized in four levels 310, 320, 330, 340. The leveling process of the electronic circuit is performed by sorting the logic gates X, X1, X2, X3, X4, X5 in the electronic circuit in the different levels 310, 320, 330, 340 according to their logic depth. Still referring to FIG. 9, the first logic gate X1 is assigned to a first level 310, the second and third logic gates X2, X3 are assigned to a second level 320, the fourth logic gate X4 is assigned to a third level 330, and the fifth logic gate X5 is assigned to a fourth level 340.

Further a static timing analysis tool is used to determine inertial delay of the logic gates X1, X2, X3, X4, X5, the earliest and the latest signal arrival times EAT, LAT at nets N1, N2, N3, N4, N5, N6, and the capacitance of the nets N1, N2, N3, N4, N5, N6 of the logic gates X1, X2, X3, X4, X5 of the logic cone 300 to be evaluated, wherein an averaged gate delay is used to approximate the inertial delay of the logic gates X1, X2, X3, X4, X5.

In case of full circuit calculation during a first calculation step a priority queue 12 is initialized with all logic gates of the first level 310 here with the first logic gate X1 connected with primary input nets N1, N2 of the logic cone 300 only, as shown by FIG. 9. Further a number of signal transitions at the primary input nets N1, N2 are defined as 1. That means that the transition metrics TMN1, TMN2 at the primary input nets N1, N2 are also defined as 1. The power metrics PMN1, PMN2 at the primary input nets N1, N2 are calculated by using equation (4).

During a second calculation step transition metric $TM_{N3}$ at the output net N3 of the first logic gate X1 of the first level 310 is calculated according to equation (3), based on the transition metrics $TM_{N1}$, $TM_{N2}$ at the primary input nets N1, N2. Based on the transition metric $TM_{N3}$ at the output net N3 of the first logic gate X1 the power metric $PM_{N3}$ at the output net N3 is calculated according to equation (4). Since the first logic gate X1 is not the end of the logic cone 300 the fan-out gates X2, X3 are pushed to the priority queue 12 during the second calculation step.

During a third calculation step transition metric $TM_{N4}$ at the output net N4 of the second logic gate X2 of the second level 320 and transition metric $TM_{N5}$ at the output net N5 of the third logic gate X3 of the second level 320 are calculated according to equation (3), based on transition metric $TM_{N1}$ at the primary input net N1 and transition metric $TM_{N3}$ at the input net N3 of the second logic gate X2 and the third logic gate X3. Based on the transition metric $TM_{N4}$ at the output net N4 of the second logic gate X2 the power metric PMN4 at the output net N4 is calculated according to equation (4). Based on the transition metric $TM_{N5}$ at the output net N5 of the third logic gate X3 the power metric $PM_{N5}$ at the output net N5 is calculated according to equation (4). Since the second and third logic gates X2, X3 are not the end of the logic cone 300 the fan-out gates X4, X5 are pushed to the priority queue 12 during the third calculation step.

During a fourth calculation step transition metric $TM_{N6}$ at the output net N6 of the fourth logic gate X4 of the third level 330 is calculated according to equation (3), based on the transition metric $TM_{N5}$ at the input net N5 of the fourth logic gate X4. Based on the transition metric $TM_{N6}$ at the output net N6 of the fourth logic gate X4 the power metric $PM_{N6}$ at the output net N6 is calculated according to equation (4). Since the fourth logic gate X4 is not the end of the logic cone 300 the fan-out gate X5 is pushed to the priority queue 12 during the fourth calculation step S4. Since the fan-out gate X5 is already in the priority queue 12 the former input is overwritten.

During a fifth calculation step transition metric TMN7 at the output net N7 of the fifth logic gate X5 of the fourth level 340 is calculated according to equation (3), based on the transition metrics $TM_{N4}$, $TM_{N6}$ at the input nets N4, N6 of the fifth logic gate X5. Based on the transition metric TMN7 at the output net N7 of the fifth logic gate X5 the power metric $PM_{N7}$ at the output net N7 is calculated according to equation (4). Since the fifth logic gate X5 is the end of the logic cone 300 no fan-out gates are pushed to the priority queue 12 during the fifth calculation step S5 and the priority queue 12 is empty and the full circuit calculation is finished. The full circuit calculation results may be written to the data storage 30.

During optimization of the power consumption of the electrical circuit logic gates X1, X2, X3, X4, X5 of the electrical circuit shown in FIG. 9 may be resized.

Some example embodiments use a corresponding search function to find a set of gates which need to be resized according to the corresponding transition metric. The logic gates owning high transition metrics at output nets are chosen as candidates to resize and written to a gates to resize list 16, because the glitch probability at those nets is high. If a gate near the primary input is resized, the impact on other gates is higher than resizing a gate near the primary output. Therefore, the optimization starts from the gates with lowest logic depth.

Referring to FIG. 10, the fourth logic gate X4 has dynamic power consumption greater than a predetermined threshold value. So the fourth logic gate X4 is written to the gates to resize list 16 and an investigation function is used to investigate all available sizes of the candidate gate X4 one by one in a corresponding loop, and each gate in the gates to resize list 16 will be investigated one by one. The influence of the new cell is evaluated by computing the sum of power metrics according to formula (4) or (5). To calculate the sum of power metric of the logic cone 300' with the resized gate X4' the increment circuit calculation is performed.

In case of increment circuit calculation during a first calculation step the priority queue 12 is initialized with at least one logic gate, here the third logic gate X3, which fan-out gate is directly connected to a fan-in gate of the resized gate, here the fourth logic gate X4'. Further, transition metrics $TM_{N1}$, $TM_{N2}$, $TM_{N3}$, $TM_{N4}$ at the nets N1, N2, N3, N4 not influenced by the resized logic gates, here the fourth logic gate X4', are taken from the results of the full circuit calculation during the first calculation step. Also the corresponding power metrics $PM_{N1}$, $PM_{N2}$, $PM_{N3}$, $PM_{N4}$ are taken from the results of the full circuit calculation during the first calculation step.

During a second calculation step transition metric $TM_{N5}$ at the output net N5 of the third logic gate X3 of the second level 320 is recalculated according to equation (3), based on transition metric $TM_{N3}$ at the input net N3 of the third logic gate X3. Based on the transition metric $TM_{N5}$ at the output net N5 of the third logic gate X3 the power metric $PM_{N5}$ at the output net N5 is recalculated according to equation (4). Since the third logic gate X3 is not the end of the logic cone 300' the fan-out gate X4' is pushed to the priority queue 12 during the second calculation step.

During a third calculation step transition metric $TM_{N6}$ at the output net N6 of the resized fourth logic gate X4' of the third level 330 is recalculated according to equation (3), based on the transition metric $TM_{N5}$ at the input net N5 of the resized fourth logic gate X4'. Based on the transition metric $TM_{N6}$ at the output net N6 of the resized fourth logic gate X4' the power metric $PM_{N6}$ at the output net N6 is recalculated according to equation (4). Since the resized fourth logic gate X4' is not the end of the logic cone 300' the fan-out gate X5 is pushed to the priority queue 12 during the third calculation step.

During a fourth calculation step transition metric $TM_{N7}$ at the output net N7 of the fifth logic gate X5 of the fourth level 340 is recalculated according to equation (3), based on the transition metrics $TM_{N4}$, $TM_{N6}$ at the input nets N4, N6 of the fifth logic gate X5. Based on the transition metric $TM_{N7}$ at the output net N7 of the fifth logic gate X5 the power metric $PM_{N7}$ at the output net N7 is recalculated according to equation (4). Since the fifth logic gate X5 is the end of the logic cone 300' no fan-out gates are pushed to the priority queue 12 during the fourth calculation step S4' and the priority queue 12 is empty and the incremented circuit calculation is finished. The incremented circuit calculation results may also be written to the data storage 30.

If the actual evaluated sum of power metrics is less than an already saved optimum power metric, the corresponding gate size and sum of power metrics are recorded as optimum cell and optimum sum of power metrics, respectively. The loop continues until all available sizes are tried. After all equivalent cells are investigated, the best cell X4' saved as optimum cell is used and substitutes the current cell X4. The resized gate X4' is pushed into the freezing list 14 by using a freeze function. In the optimization procedure, the configuration with the smallest total power metric is chosen and the gate X4 resized before it is frozen or recorded in the freezing list 14.

To prevent the solution from a local optimum, a perturbance function is introduced which releases some gates frozen in the freezing list randomly, after all candidate gates in the gates to resize list 16 are resized. The gates newly pushed into the freezing list 14 are much more likely to be released than the gates that stay in the freezing list for a long time. With the increase of optimization steps, the number of gates that are allowed to be released from the freezing list 14 decreases as well. After such a stochastic decision, a new gates to resize list 16 is determined. The optimization procedure runs until the gates to resize list 16 is empty.

Referring to FIG. 11 the electrical circuit to evaluate comprises a logic cone 300' with two primary input nets N1, N2, one output net N7 and five logic gates X1, X2, X3, X4', X5. The main difference between the logic cone 300 and the logic cone 300' is the resized fourth logic gate X4'. Because of the resized fourth logic gate X4' the timing and power behavior of the logic cone 300' is different to the logic cone 300, especially the load capacitance of the third logic gate X3 and an input slew of the fifth logic gate X5 are influenced. Still referring to FIG. 11, the first logic gate X1 implemented as AND-gate having an inertial delay of 1 and a second logic gate X2 implemented as AND-gate having an inertial delay of 1 are both unchanged, due to the resized logic gate X4'. The inertial delay of the third logic gate X3 implemented as inverter is changed to 0.5, the inertial delay of the fourth logic gate X4' implemented as inverter is changed to 1.0, and the inertial delay of the fifth logic gate X5 implemented as AND-gate is changed to 3.0 due to the resized fourth logic gate X4'.

Example embodiments of reducing power consumption of an electronic circuit can be implemented as an entirely software embodiment, or an embodiment containing both hardware and software elements. In a preferred embodiment, the present invention is implemented in software, which includes but is not limited to firmware, resident software, microcode, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for movement reduction as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
reducing power consumption of an electronic circuit using a gate-level design representation, wherein the electronic circuit comprises at least one logic cone with at least one gate having a single output net, wherein representations of the at least one gate are instances of elements from a standard cell library, wherein the reducing of the power consumption of the electronic circuit comprises:
determining an upper bound for dynamic power consumption by calculating transition metrics and power metrics for each gate in the electronic circuit;
selecting gates with an upper bound for power consumption greater than a predetermined threshold value;
for each selected gate performing the following operations:
testing multiple configurations from the standard cell library for the selected gate by calculating respective upper bound for power consumption for each of the multiple configurations;
selecting gate configuration of the multiple configurations with minimum upper bound for power consumption; and
modifying the gate-level design representation according to the selected gate configuration.

2. The method of claim 1, wherein a transition metric of an output net of a gate under consideration is defined as minimum value between a sum of signal transitions at input nets of the gate under consideration and a component dependent on a glitch window defined as difference between latest and earliest signal arrival times at the output net of the gate under consideration and an inertial delay of the gate under consideration.

3. The method of claim 2, wherein the reducing of the power consumption of the electronic circuit comprises investigating at least one of cell configurations with different threshold voltages and different drive strengths in the standard cell library to test the gate.

4. The method of claim 3, wherein the reducing of the power consumption of the electronic circuit comprises calculating the power metric of a corresponding net dependent on the transition metric and a capacitance of the net.

5. The method of claim 4, wherein the upper bound for power consumption of a gate is represented by an upper bound of a number of signal transitions at the output net of the gate under consideration determined based on the corresponding transition metric.

6. The method of claim 5, wherein prior to determining an upper bound for dynamic power consumption by calculating transition metrics and power metrics for each gate in the electronic circuit,
levelizing the electronic circuit by sorting the gates in the electronic circuit in different levels according to their logic depth; and
initializing a freezing list.

7. The method of claim 6, wherein the selected gates are sorted according to the different levels starting with gates comprising a level with lowest logic depth.

8. The method of claim 7, wherein performing the following operations comprises adding each selected gate to the freezing list after testing.

9. The method of claim 8, wherein a perturbance function is implemented to release randomly some gates frozen in the freezing list after all selected gates are modified.

10. A computer program product for reducing power consumption of an electronic circuit, the computer program product comprising:
a computer readable storage medium having computer usable program code embodied therewith, the computer usable program code comprising a computer usable program code configured to:
determine an upper bound for dynamic power consumption by calculating transition metrics and power metrics for each gate in the electronic circuit, wherein the electronic circuit comprises at least one logic cone with at least one gate having a single output net, wherein representations of the at least one gate are instances of elements from a standard cell library;
select gates in the electronic circuit with an upper bound for power consumption greater than a predetermined threshold value;
for each selected gate perform the following operations:
test multiple configurations from the standard cell library for the selected gate by calculation of respective upper bound for power consumption for each of the multiple configurations;
select gate configuration of the multiple configurations with minimum upper bound for power consumption; and
modify gate-level design representation for the electronic circuit according to the selected gate configuration.

11. The computer program product of claim 10, wherein a transition metric of an output net of a gate under consideration is defined as minimum value between a sum of signal transitions at input nets of the gate under consideration and a component dependent on a glitch window defined as difference between latest and earliest signal arrival times at the output net of the gate under consideration and an inertial delay of the gate under consideration.

12. The computer program product of claim 11, wherein the computer usable program code is configured to investigate at least one of cell configurations with different threshold voltages and different drive strengths in the standard cell library to test the gate.

13. The computer program product of claim 12, wherein the computer usable program code is configured to calculate the power metric of a corresponding net dependent on the transition metric and a capacitance of the net.

14. The computer program product of claim 13, wherein the upper bound for power consumption of a gate is represented by an upper bound of a number of signal transitions at the output net of the gate under consideration determined based on the corresponding transition metric.

15. The computer program product of claim 14, wherein prior to determination of an upper bound for dynamic power consumption by calculation of transition metrics and power metrics for each gate in the electronic circuit, the computer usable program code is configured to levelize the electronic circuit by sorting the gates in the electronic circuit in different levels according to their logic depth, wherein the selected gates are sorted according to the different levels starting with gates comprising a level with lowest logic depth;

initialize a freezing list; and add each selected gate to the freezing list after test, wherein a perturbance function is implemented to release randomly some gates frozen in the freezing list after all selected gates are modified.

16. An apparatus comprising:

a processor;

a data processing engine executable on the processor, the data processing engine configured to, reduce power consumption of an electronic circuit using a gate-level design representation, wherein the electronic circuit comprises at least one logic cone with at least one gate having a single output net, wherein representations of the at least one gate are instances of elements from a standard cell library, wherein the reduction of the power consumption of the electronic circuit comprises:

determine an upper bound for dynamic power consumption by calculating transition metrics and power metrics for each gate in the electronic circuit;

select gates in the electronic circuit with an upper bound for power consumption greater than a predetermined threshold value;

for each selected gate perform the following operations:

test multiple configurations from the standard cell library for the selected gate by calculation of respective upper bound for power consumption for each of the multiple configurations;

select gate configuration of the multiple configurations with minimum upper bound for power consumption; and modify the gate-level design representation for the electronic circuit according to the selected gate configuration.

17. The apparatus of claim 16, wherein a transition metric of an output net of a gate under consideration is defined as minimum value between a sum of signal transitions at input nets of the gate under consideration and a component dependent on a glitch window defined as difference between latest and earliest signal arrival times at the output net of the gate under consideration and an inertial delay of the gate under consideration.

18. The apparatus of claim 17, wherein the data processing engine is configured to investigate at least one of cell configurations with different threshold voltages and different drive strengths in the standard cell library to test the gate.

19. The apparatus of claim 18, wherein the data processing engine is configured to calculate the power metric of a corresponding net dependent on the transition metric and a capacitance of the net, wherein the upper bound for power consumption of a gate is represented by an upper bound of a number of signal transitions at the output net of the gate under consideration determined based on the corresponding transition metric.

20. The apparatus of claim 19, wherein prior to determination of an upper bound for dynamic power consumption by calculation of transition metrics and power metrics for each gate in the electronic circuit, the data processing engine is configured to:

levelize the electronic circuit by sorting the gates in the electronic circuit in different levels according to their logic depth, wherein the selected gates are sorted according to the different levels starting with gates comprising a level with lowest logic depth;

initialize a freezing list; and add each selected gate to the freezing list after test, wherein a perturbance function is implemented to release randomly some gates frozen in the freezing list after all selected gates are modified.

* * * * *